United States Patent
Cho et al.

(10) Patent No.: US 8,472,869 B2
(45) Date of Patent: Jun. 25, 2013

(54) RELAY COMMUNICATION METHOD OF NEXT GENERATION CELLULAR COMMUNICATION SYSTEM

(75) Inventors: Dong Ho Cho, Daejeon (KR); Hee Jung Yu, Daejeon (KR); Young Seok Oh, Daejeon (KR); Ho Won Lee, Daejeon (KR); Woong Sup Lee, Daejeon (KR); Yong Hoon Lee, Daejeon (KR)

(73) Assignee: Korea Advanced Institute of Science and Technology, Gusung-Dong, Yusong-Gu, Daejon (KR)

( * ) Notice: Subject to any disclaimer, the term of this patent is extended or adjusted under 35 U.S.C. 154(b) by 282 days.

(21) Appl. No.: 12/682,179

(22) PCT Filed: Feb. 4, 2008

(86) PCT No.: PCT/KR2008/000653
§ 371 (c)(1),
(2), (4) Date: Jun. 22, 2010

(87) PCT Pub. No.: WO2009/048204
PCT Pub. Date: Apr. 16, 2009

(65) Prior Publication Data
US 2010/0261480 A1    Oct. 14, 2010

(30) Foreign Application Priority Data
Oct. 8, 2007 (KR) .................. 10-2007-0100764

(51) Int. Cl.
*H04B 7/15*    (2006.01)
(52) U.S. Cl.
USPC .............. 455/11.1; 455/445; 455/7; 455/13.1
(58) Field of Classification Search
USPC .................... 455/445, 7, 13.1, 11.1
See application file for complete search history.

(56) References Cited

U.S. PATENT DOCUMENTS

| | | | |
|---|---|---|---|
| 2003/0186721 A1 | 10/2003 | Kanazawa | |
| 2005/0143130 A1* | 6/2005 | Horneman | 455/561 |
| 2007/0002766 A1 | 1/2007 | Park | |
| 2008/0085677 A1* | 4/2008 | Sheen et al. | 455/7 |
| 2009/0088072 A1* | 4/2009 | Rofougaran et al. | 455/13.1 |

FOREIGN PATENT DOCUMENTS

WO    WO 2004/079943 A1    9/2004

OTHER PUBLICATIONS

International Search Report from parent Application No. PCT/KR2008/000653 (2 pages) Jul. 8, 2008.

* cited by examiner

*Primary Examiner* — Justin Lee
(74) *Attorney, Agent, or Firm* — Flaster/Greenberg P.C.

(57) ABSTRACT

A method of performing relay communication in a next generation cellular communication system is disclosed. The next generation cellular communication system includes a base station and a plurality of terminals, and a communication target terminal which has not acquired a Line-Of-Sight (LOS) channel with the base station performs communication through the relay of a relaying terminal which has acquired a LOS channel. The base station determines the relaying terminal. The relaying terminal forms a relaying terminal group by determining one or more relaying assistant terminals. The communication target terminal forms a transmitting/receiving terminal group by determining one or more transmitting/receiving assistant terminals. The base station performs communication with the relaying terminal through the relaying terminal, relaying assistant terminals of the relaying terminal group and the transmitting/receiving assistant terminals of the transmitting/receiving terminal group.

14 Claims, 3 Drawing Sheets

RELAY COMMUNICATION METHOD OF NEXT GENERATION CELLULAR COMMUNICATION SYSTEM

BACKGROUND OF THE INVENTION

1. Field of the Invention

Figure 1:
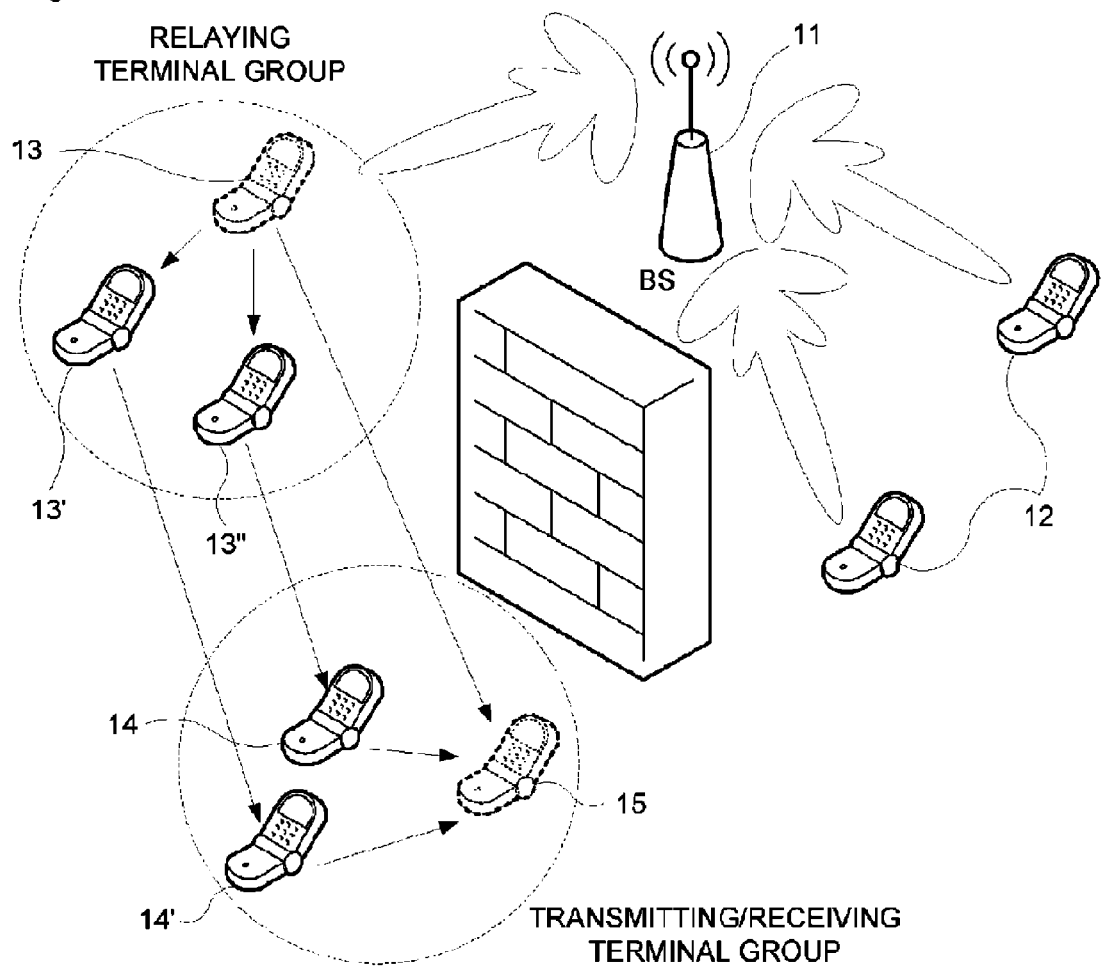

The present invention relates to a method of performing relay communication by constructing a relaying terminal group and a transmitting/receiving terminal group and then using cooperation between the groups, so as to realize effective communication between a base station and one or more terminals in a next generation cellular communication system which uses a band of several tens of GHz.

2. Description of Related Art

Currently, a cellular communication system provides voice or data service to users in a relatively wide area using a 2 GHz or lower frequency band. In the case of current service, since a low speed service, the maximum speed of which is several Mbps, is provided, the narrow bandwidth does not matter. Further, since the 2 GHz or lower frequency band has relatively good propagation characteristics, communication can be sufficiently realized, even though a Line-Of-Sight (LOS) channel is not ensured. Further, in order to provide service to regions, such as an underground and mountain regions, which the signals of a base station cannot reach, service areas have been expanded using repeaters. Furthermore, research has been widely conducted so as to improve the strength of a link or increase transmission speed through the cooperation between a plurality of terminals.

Systems that use a high frequency band of 60~70 GHz for communication include a very short-range communication system, such as a Wireless Personal Area Network (WPAN), and a wireless trunk system for substituting for a wired trunk between buildings. The WPAN defines a system for providing several Gbps high-speed data communication using a high frequency band with a maximum bandwidth of 1 GHz. In the case in which a high frequency carrier is used, there is an advantage in that a wide bandwidth can be acquired but the propagation characteristics are not desirable. Therefore, in the case in which an omnidirectional antenna is used, communication is not possible if a terminal locates out of a region of several tens of meter in which a LOS channel is ensured. Therefore, the system has a restriction in that it can only be used for short-range communication.

Meanwhile, a wireless trunk system for connecting buildings has solved a problem of wave propagation distance using an antenna having high directivity, such as a parabolic antenna. As a method for utilizing antenna gain, a parabolic antenna having strong directivity can be used, as in a wireless trunk system, but the antenna can be used only for point-to-point communication. Therefore, in order to perform point-to-multipoint communication while maximizing antenna gain, directivity of the antenna must be varied at any time using an array antenna.

Until now, in consideration of propagation characteristics, most communication systems using a high frequency of several tens of GHz have been used in a WPAN, which has a very narrow service area, and have used an antenna with which a LOS channel is reliably ensured and which has a high gain like a parabolic antenna. However, in the case in which this is expanded to a general communication system, such as a cellular communication system, a high gain can be realized using an antenna array, but it is considerably difficult to support a user for whom a LOS channel is not ensured.

That is, although the use of a repeater can be considered as an example of supporting a user for whom a LOS channel is not ensured, this may impose a burden on the entire communication system. When an existing low frequency is used, the shadow region is not wide, so that a repeater can be installed. However, in the case in which a frequency of several tens GHz is used, the portion of the shadow region increases, so that there is a burden in that a large number of repeaters must be installed, and a large number of non-LOS channels may be generated between the links of repeaters and terminals, so that there is a problem in that the communication between a base station and a terminal is not supported at all in a non-LOS channel between the repeater and a terminal.

Currently, a cellular communication system uses a low frequency band which has excellent propagation characteristics, and the International Telecommunication Union (ITU) is considering a band of several tens of GHz as a candidate frequency band for a next generation cellular communication system. The high frequency band which will be used in the next generation cellular communication system has poor propagation characteristics. Therefore, when a LOS channel is not ensured, the intensity of received signals is insufficiently small, and thus communication cannot be realized.

BRIEF SUMMARY OF THE INVENTION

Accordingly, the present invention has been made keeping in mind the above problems occurring in the prior art, and an object of the present invention is to provide a method of performing relay communication in a next generation cellular communication system, which expands the wave propagation distance by maximizing an antenna array gain in such a way as to install a plurality of antennas at transmitters and receivers, thereby performing communication with a terminal which has not acquired a LOS channel, with aid of a terminal group which has acquired a LOS channel.

In order to accomplish the above object, the present invention provides a method of performing relay communication in a next generation cellular communication system including a base station and a plurality of terminals, a communication target terminal which has not acquired a Line-Of-Sight (LOS) channel with the base station performing communication through the relay of a relaying terminal which has acquired a LOS channel, the method comprising a first step of the base station determining the relaying terminal; a second step of the relaying terminal forming a relaying terminal group by determining one or more relaying assistant terminals; a third step of the communication target terminal forming a transmitting/receiving terminal group by determining one or more transmitting/receiving assistant terminals; and a fourth step of the base station performing communication with the relaying terminal through the relaying terminal and relaying assistant terminals of the relaying terminal group and the transmitting/receiving assistant terminals of the transmitting/receiving terminal group.

In order to solve the problem of the lack of frequency resources of a low frequency band, the present invention provides a method of constructing a next generation cellular communication system using high frequency resources in a band of several tens of GHz. According to the present invention, a relaying function is strengthened in the consideration of the characteristics of a high frequency, the propagation characteristics of which are not good, with the result that a method of not relaying using a single repeater or a single terminal but relaying between terminal groups is provided, so that there is an effect in which a non-LOS channel terminal can perform communication with a base station using a LOS channel terminal group.

BRIEF DESCRIPTION OF THE SEVERAL VIEWS OF THE DRAWING(S)

Figure 2:
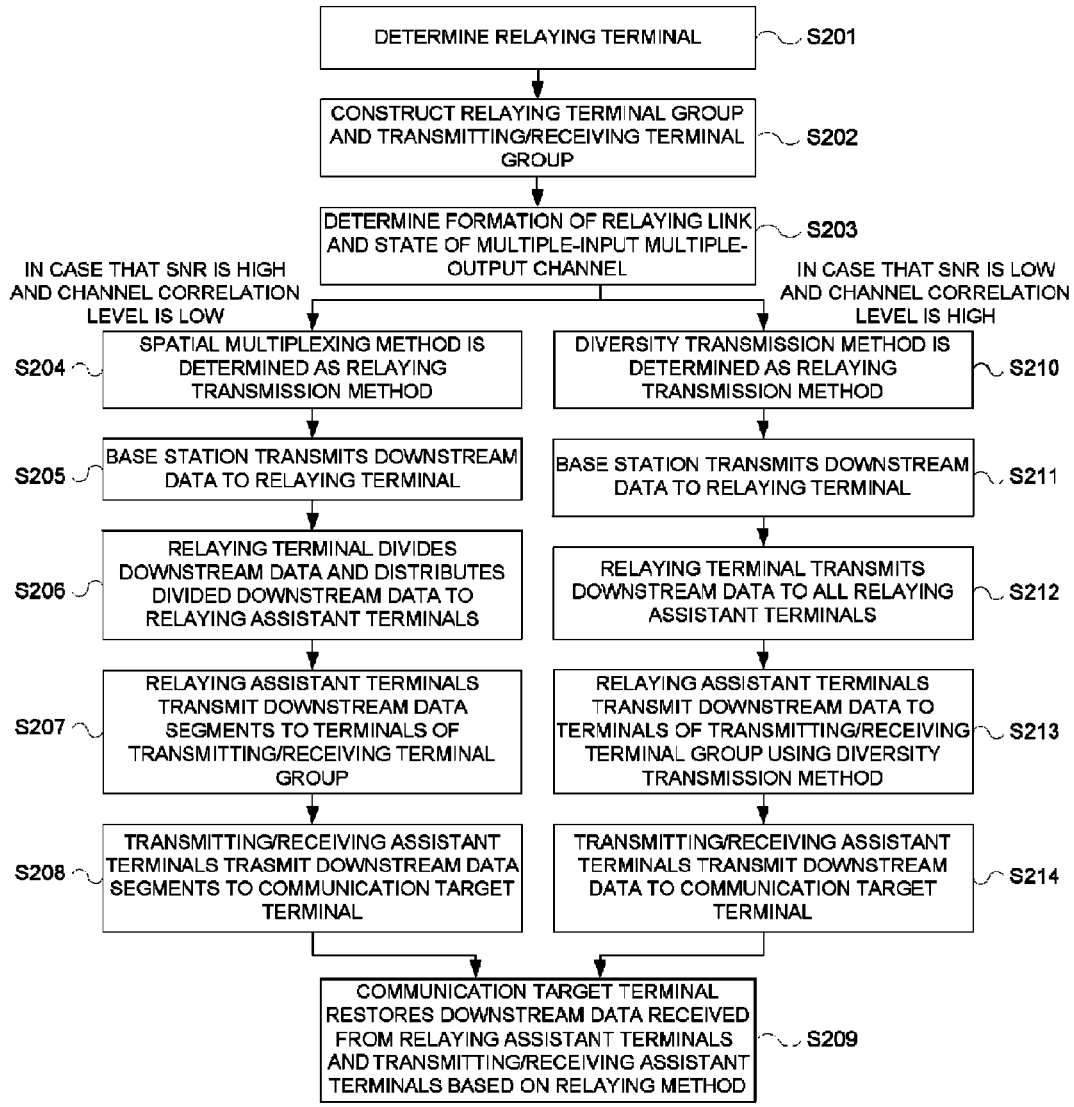
Figure 3:
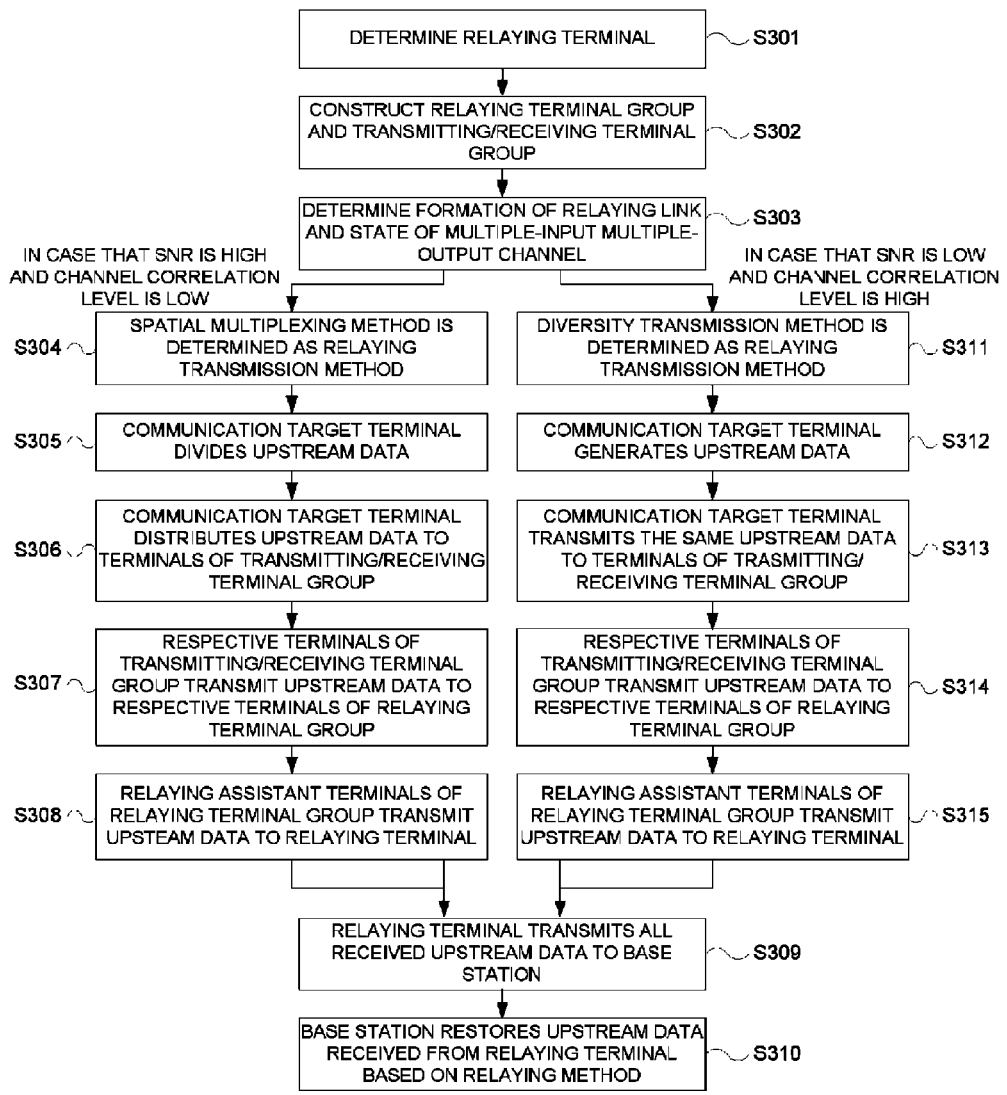

FIG. 1 is a diagram showing the configuration of a next generation cellular communication system to which the present invention is applied;

FIG. 2 is a flowchart showing a method of transmitting downstream data between a base station and a non-LOS channel communication target terminal according to an embodiment of the present invention; and FIG. 3 is a flowchart showing a method of transmitting upstream data transmission between a base station and a non-LOS channel communication target terminal according to an embodiment of the present invention

DETAILED DESCRIPTION OF THE INVENTION

It is assumed that the next generation cellular communication system, to which the present invention is applied, uses a high frequency band of several tens of GHz. Although the next generation cellular communication system can use a 2 GHz or lower band, similar to that used at present, this may be ineffective in view of propagation characteristics, the size of the antenna, and the antenna separation distance which are formed by a wavelength of carrier wave. The present invention enables a signal to be transmitted or received to or from a terminal, which acquires a LOS channel, by utilizing a beamforming method using the antenna array of a base station. Here, the terminal may have one or more antennas.

In the present invention, a LOS channel terminal is a terminal which acquires a LOS channel with a base station, and a non-LOS channel terminal is a terminal which does not acquired a LOS channel with a base station. Further, a LOS channel terminal group is a group of the LOS channel terminals. A relaying terminal group is a group of terminals, each of which is included in the LOS channel terminals and relays the communication between a base station and a non-LOS channel terminal group.

FIG. 1 is a diagram showing the configuration of the next generation cellular communication system to which the present invention is applied. The next generation cellular communication system includes a base station 11 for managing a cell, and a plurality of terminals included in the cell. The terminals are divided into LOS channel terminals 12, 13, 13', and 13", each of which acquires a LOS channel with the base station 11, and non-LOS channel terminals 14, 14', and 15, none of which acquires a LOS channel with the base station 11 due to obstacles. When communication is directly performed between the base station 11 and one of the LOS channel terminals 12, the base station 11 directly forms an antenna beam toward the LOS channel terminal, so that communication between the base station 11 and the corresponding LOS channel terminal is realized.

However, in the case in which a LOS channel is not acquired between the base station and the target terminal due to buildings or other obstacles, a communication link between the base station and the terminal is formed with the assistance of other terminals. Here, a relaying terminal must be a LOS channel terminal, and a relaying terminal 13 and one or more relaying assistant terminals 13' and 13" form a relaying terminal group. A transmitting/receiving terminal group includes one or more transmitting/receiving assistant terminals 14 and 14' and a communication target terminal 15. The transmitting/receiving assistant terminals 14 and 14' communicate with the terminals of the relaying terminal group and assist the communication of the target terminal 15.

The base station 11 generates downstream data to be transmitted to the communication target terminal with a non-LOS channel, and transmits it to the relaying terminal 13, which has acquired a LOS channel, using a beamforming technique. Thereafter, the relaying terminal 13 transmits the corresponding data to the transmitting/receiving terminal group by cooperating with the relaying assistant terminals 13' and 13". The transmitting/receiving assistant terminals 14 and 14' of the transmitting/receiving terminal group transmit the received data to the communication target terminal 15. The relaying assistant terminals are terminals, each of which has acquired a LOS channel with the relaying terminals and communicates with the relaying terminals but does not perform communication with the base station. The transmitting/receiving assistant terminals, which construct the transmitting/receiving terminal group, are non-LOS channel terminals, each of which communicates with the communication target terminal by acquiring a LOS channel thereto but cannot directly communicate with the base station.

Upstream data, transmitted by the communication target terminal 15 to the base station 11, is transmitted to the relaying terminal group, that is, the relaying terminal 13 and the relaying assistant terminals 13' and 13" through the transmitting/receiving assistant terminal 14 and 14'. The relaying terminal 13 collects the upstream data of the communication target terminal, distributed and input through the relaying assistant terminals 13' and 13" and then transmits the collected upstream data to the base station 11.

Although concepts of improving link performance or expanding coverage using relaying terminals have been introduced up to now, the present invention proposes a method of constructing a relaying terminal group using a LOS channel terminal group, and performing communication by cooperating with a non-LOS channel terminal group using the relaying terminal group.

FIG. 2 is a flowchart showing a method of transmitting downstream data between a base station and a communication target terminal on a non-LOS channel according to an embodiment of the present invention.

A base station determines a relaying terminal which has acquired a LOS channel at step S201, and forms a relaying terminal group and a transmitting/receiving terminal group by constructing relaying assistant terminals for assisting the relaying terminal and transmitting/receiving assistant terminals for assisting the transmission/reception of a communication target terminal at step S202.

That is, the base station transmits a relay transmitting request signal to LOS channel terminals, and one of the LOS channel terminals, which received the relay transmitting request signal and has no data to be transmitted the base station, transmits a response signal for the relay request to the base station, and then reserves relay transmission, thereby becoming a relaying terminal. Thereafter, when the relaying terminal transmits a relay assistance request signal to the adjacent terminals thereof, some of the adjacent terminals, which can participate in the relay, transmit response signals in response to the relay assistant request, thereby forming a relaying terminal group. In the same manner, when the communication target terminal transmits a transmission/reception assistance request signal to the adjacent terminals thereof, the adjacent terminals transmit response signals therefor, so that a transmitting/receiving terminal group is formed.

After the relaying terminal group and transmitting/receiving terminal group are formed, the base station transmits and receives an arbitrary signal to and from the communication target terminal through the relaying terminal group and the transmitting/receiving terminal group, thereby determining the formation of a relay link at step S203. In this step, the base station can make aware of the characteristics of a virtual multi-input multi-output channel between the relaying terminal group and the transmitting/receiving terminal group, for example, it can measure a signal-to-noise ratio and channel correlation level.

The base station selects a transmission method for a multiple-input multiple-output relay link based on the results of the determination at step S203.

At step S203, when the state of a multiple-input multiple-output channel is good because the signal-to-noise ratio of a virtual multi-channel is high and the channel correlation of the virtual multi-channel is low, the base station determines a spatial multiplexing transmission method as a relay transmission method at step S204, and modulates downstream data to be transmitted to the communication target terminal and transmits the modulated downstream data to the relaying terminal at step S205. Thereafter, the relaying terminal demodulates the modulated downstream data, divides the demodulated downstream data by the number of terminals included in the relaying terminal group, and then distributes each of the resulting sets of data to the respective relaying assistant terminals included in the relaying terminal group at step S206. In the case in which the spatial multiplexing transmission method is used as the relay transmission method, the number of terminals included in the transmitting/receiving terminal group must be at least greater than or equal to the number of data streams transmitted from the relaying terminal group.

Each of the relaying terminal and relaying assistant terminals, included in the relaying terminal group, transmits the distributed downstream data segments to the corresponding communication target terminal and transmitting/receiving assistant terminals of the transmitting/receiving terminal group, respectively, at step S207. Each of the transmitting/receiving assistant terminals transmits the distributed downstream data segment received by itself to the communication target terminal at step S208. The communication target terminal performs spatial multiplexing detection for distributed downstream data segments received through the terminals included in the relaying terminal group and the transmitting/receiving assistant terminals included in the transmitting/receiving terminal group based on the relay transmission method (the spatial multiplexing transmission method), and restores the downstream data at step S209.

As described above, if downstream data segments, which are different from each other, are transmitted at the same time using the spatial multiplexing transmission method, a large amount of data can be transmitted in a short time.

Meanwhile, as the results of the determination at step S203, when the state of a channel is not good because the signal-to-noise ratio of the virtual multi-channel is low and the channel correlation of the virtual multi-channel is high, the base station determines a diversity transmission method as the relay transmission method at step S210, and modulates downstream data to be transmitted to the communication target terminal and transmits the modulated downstream data to the relaying terminal at step S211. Thereafter, the relaying terminal demodulates the modulated downstream data and then transmits the demodulated downstream data to all of the relaying assistant terminals included in the relaying terminal group at step S212. The relaying terminal and relaying assistant terminals, included in the relaying terminal group, transmit common downstream data to the transmitting/receiving terminal group using a diversity transmission method, such as a time/space coding method, at step S213. The transmitting/receiving assistant terminals of the transmitting/receiving terminal group transmit the received common downstream data to the communication target terminal at step S214.

The communication target terminal performs diversity detection for the common downstream data received through the terminals included in the relaying terminal group and the transmitting/receiving assistant terminals included in the transmitting/receiving terminal group based on the relay transmission method (the diversity transmission method), and restores the downstream data at step S209.

According to the diversity transmission method, although the data transmission time is long, the strength of the relay transmission link can be acquired.

The present invention can not only select one among the spatial multiplexing transmission method and the diversity transmission method as a relay method, but can also use a transmission method in which both of the transmission methods are appropriately combined. For example, in the case in which the number of relaying assistant terminals is three and downstream data is divided into two parts, one part can be transmitted using spatial multiplexing transmission method and the other part can be transmitted using the diversity transmission method.

However, in the case in which communication cannot be performed using the diversity transmission method because the channel state is not good, the process proceeds at an initial state and starts a group formation step.

If the states of the relaying terminal, the relaying assistant terminals, and transmitting/receiving assistant terminals are maintained unchanged in the relay process, communication can be smoothly realized. However, in the case in which an arbitrary terminal moves when relay transmission is performed, and thus relay through cooperation cannot be realized anymore, or in the case in which a terminal, which has participated in relay, is required to directly communicate with the base station, the corresponding terminal which has participated in relay must leave the relay cooperation status.

When an arbitrary relaying assistant terminal attempts to leave the relaying terminal group, the arbitrary relaying assistant terminal requests that the relaying terminal allow the relaying assistant terminal to leave the corresponding group. When an arbitrary transmitting/receiving assistant terminal attempts to leave the transmitting/receiving terminal group, the arbitrary transmitting/receiving assistant terminal requests that the communication target terminal allow the transmitting/receiving assistant terminal to leave the corresponding group. The relaying terminal or communication target terminal, which received the request for the leave, permits the relaying assistant terminal or transmitting/receiving assistant terminal to leave the corresponding group. The terminal, having left the corresponding group, returns to its initial state and then forms a new communication link or enters a waiting state. The remaining terminals in the corresponding group form a group again and start to transmit data again.

FIG. 3 is a flowchart showing a method of transmitting upstream data transmission between a base station and non-LOS channel communication target terminal according to an embodiment of the present invention.

The upstream link is constructed using a concept that is the reverse of the downstream link.

First, a relaying terminal for relaying communication between a base station and a communication target terminal is selected among LOS channel terminals, each of which acquires a LOS channel with the base station at step S301. A relaying terminal group and a transmitting/receiving terminal group are constructed by determining the relaying assistant terminals, each of which acquires a LOS channel with the relay terminal, and transmitting/receiving assistant terminals, each of which acquires a LOS channel with the communication target terminal, at step S302. Here, a LOS channel must be acquired between the relaying terminal group and the transmitting/receiving terminal group.

Next, in order to determine a relay transmission method, an arbitrary signal is exchanged between the base station and the communication target terminal so as to determine the formation of a relay link and determine the state of a multiple-input multiple-output channel (a signal-to-noise ratio and a channel correlation level) at step S303.

As the result of the determination of the state of the multiple-input multiple-output channel, if the signal-to-noise ratio is determined to be high and the channel correlation is determined to be low, the spatial multiplexing transmission method is determined as the relay transmission method at step S304; and, if the signal-to-noise ratio is low and the channel correlation is high, the diversity transmission method is determined as the relay transmission method at step S311.

Up to this point, the steps are the same as the steps S201 to S204 and S210 of FIG. 2.

The actual upstream data transmission process will be described below.

In the case in which the spatial multiplexing method is used as the relay transmission method, the communication target terminal generates upstream data and divides it by the number of terminals included in the transmitting/receiving terminal group at step S305, and then distributes each of the divided upstream data segments to each of the transmitting/receiving assistant terminals of the transmitting/receiving terminal group at step S306. Each of the terminals of the transmitting/receiving terminal group transmits a corresponding upstream data segment to each of the terminals of the relaying terminal group at step S307. Each of the relaying assistant terminals of the relaying terminal transmits the upstream data segment, received from the transmitting/receiving terminal group, to the relaying terminals at step S308. The relaying terminal transmits all of the received upstream data segments to the base station at step S309. The base station restores the upstream data segments received from the relaying terminal based on the relay transmission method (spatial multiplexing method) at step S310.

Meanwhile, in the case in which the diversity transmission method is used as the relay transmission method, the communication target terminal generates upstream data at step S312, and then transmits the generated upstream data to the transmitting/receiving assistant terminals of the transmitting/receiving terminal group in the same manner at step S313. Each of the terminals of the transmitting/receiving terminal group transmits the same upstream data to each of the terminals of the relaying terminal group at step S314. Each of the relaying assistant terminals of the relaying terminal group transmits the received upstream data to the relaying terminal at step S315. The relaying terminal transmits all of the received upstream data to the base station at step S309. The base station restores the upstream data, received from the relaying terminal, based on the relay transmission method (the diversity transmission method) at step S310.

In the above embodiment, although the relaying terminal transmits the received upstream data to the base station without change and then the base station restores the upstream data based on the relay transmission method, the present invention is not limited thereto, and the relaying terminal can restore upstream data based on the relay transmission method and then transmit it to the base station.

In the above-described upstream/downstream link, a beamforming technique using an antenna array at a base station is used for the communication between a base station and a relaying terminal.

Although the technical spirit of the present invention has been described in conjunction with the accompanying drawings above, this description is intended to describe the preferred embodiments of the present invention for illustrative purposes only, and is not intended to limit the present invention. Furthermore, it will be apparent to those skilled in the art that various variations and modifications are possible within a range that does not depart from the scope of the technical spirit of the present invention The present invention can be used for communication between one or more terminals and a base station in a cellular communication system which uses several tens of Gigahertz (GHz). Further, the present invention can be applied to Peer to Peer (P2P) communication or an Ad-hop network.

We claim:

1. A method of performing relay communication in a next generation cellular communication system including a base station and a plurality of terminals, a communication target terminal which has not acquired a Line-Of-Sight (LOS) channel with the base station performing communication through a relay of a relaying terminal which has acquired a LOS channel with the base station, the method comprising:
   a first step of the base station determining the relaying terminal which has acquired a LOS channel with both the base station and communication target terminal and is in an idle communication state with respect to the base station;
   a second step of the relaying terminal determined at the first step forming a relaying terminal group by determining one or more relaying assistant terminals which have acquired a LOS channel with the relaying terminal;
   a third step of the communication target terminal forming a transmitting/receiving terminal group by determining one or more transmitting/receiving assistant terminals which have acquired a LOS channel with both the communication target terminal and the relaying terminal group; and
   a fourth step of the relaying terminal performing multiple-input multiple-output of a relay link between the base station and the communication target terminal through the relaying assistant terminals and the transmitting/receiving assistant terminals.

2. The method according to claim 1, wherein the fourth step comprises determining a relay transmission method based on a multiple-input multiple-output channel state of a relay link between the base station and the communication target terminal.

3. The method according to claim 2, wherein, if the relay transmission method is a spatial multiplexing method, the fourth step comprises:
   the relaying terminal dividing downstream data, received from the base station for the communication target terminal, into a plurality of segments, and distributing the downstream data segments to the respective relaying assistant terminals;
   the relaying assistant terminals transmitting the distributed downstream data segments to respective terminals of the transmitting/receiving terminal group;
   the transmitting/receiving assistant terminals of the transmitting/receiving terminal group transmitting the received downstream data segments to the communication target terminal; and the communication target terminal restoring the downstream data based on the downstream data segments.

4. The method according to claim 2, wherein, if the relay transmission method is a spatial multiplexing method, the fourth step comprises:
- the communication target terminal dividing upstream data for the base station into a plurality of segments, and distributing the upstream data segments to the respective transmitting/receiving assistant terminals;
- the transmitting/receiving assistant terminals transmitting the distributed upstream data segments to respective terminals of the relaying terminal group;
- the relaying assistant terminals of the relaying terminal group transmitting the received upstream data segments to the relaying terminal; and
- the relaying terminal restoring the upstream data based on the upstream data segments, and then transmitting the restored upstream data to the base station.

5. The method according to claim 2, wherein, if the relay transmission method is a spatial multiplexing method, the fourth step comprises:
- the communication target terminal dividing upstream data for the base station into a plurality of segments, and distributing the upstream data segments to the respective transmitting/receiving assistant terminals;
- the transmitting/receiving assistant terminals transmitting the distributed upstream data segments to respective terminals of the relaying terminal group;
- the relaying assistant terminals of the relaying terminal group transmitting the received upstream data segments to the relaying terminal;
- the relaying terminal transmitting the upstream data segments to the base station; and
- the base station restoring the upstream data based on the upstream data segments.

6. The method according to claim 2, wherein, if the relay transmission. method is a diversity transmission method, the fourth step comprises:
- the relaying terminal transmitting identical downstream data, received from the base station for the communication target terminal, to the relaying assistant terminals;
- the relaying assistant terminals transmitting the downstream data to respective terminals of the transmitting/receiving terminal group;
- the transmitting/receiving assistant terminals of the transmitting/receiving terminal group transmitting the downstream data to the communication target terminal; and
- the communication target terminal restoring the downstream data.

7. The method according to claim 2, wherein, if the relay transmission method is a diversity transmission method, the fourth step comprises:
- the communication target terminal transmitting identical upstream data for the base station to the transmitting/receiving assistant terminals;
- the transmitting/receiving assistant terminals transmitting the upstream data to respective terminals of the relaying terminal group;
- the relaying assistant terminals of the relaying terminal group transmitting the upstream data to the relaying terminal; and
- the relaying terminal restoring upstream data based on all the received upstream data, and then transmitting the restored upstream data to the base station.

8. The method according to claim 2, wherein, if the relay transmission method is a diversity transmission method, the fourth step comprises:
- the communication target terminal transmitting identical upstream data for the base station to the transmitting/receiving assistant terminals;
- the transmitting/receiving assistant terminals transmitting the upstream data to respective terminals of the relaying terminal group;
- the relaying assistant terminals of the relaying terminal group transmitting the upstream data to the relaying terminal;
- the relaying terminal transmitting all the received upstream data to the base station; and
- the base station restoring upstream data based on all the received upstream data.

9. The method according to claim 1, wherein the first step comprises:
- the base station transmitting a relay request signal to one or more terminals in a cell; and
- the base station determining the relaying terminal among the responding terminals, when one or more LOS channel terminals, each of which has received the relay request signal and is in an idle communication state with respect to the base station, respond to the relay request signal.

10. The method according to claim 1, wherein the second step comprises:
- the relaying terminal transmitting a relay assistance request signal to adjacent terminals, each of which has acquired a LOS channel with the relaying terminal; and
- the relaying terminal determining one or more relaying assistant terminals among responding terminals, when one or more terminals, each of which has received the relay assistance request signal and is in an idle communication state with respect to the base station, respond to the relay assistance request signal.

11. The method according to claim 10, further comprising:
- one of relaying assistant terminals requesting that the relaying terminal allow the relaying assistant terminal to leave the relaying terminal group; and
- the relaying terminal permitting the relaying assistant terminal that requested leaving from the group to leave the corresponding group, and forming the relaying terminal group again using remaining relaying assistant terminals.

12. The method according to claim 1, wherein the third step comprises:
- the communication target terminal transmitting a transmitting/receiving assistance request signal to adjacent terminals, each of which has acquired a LOS channel with the communication target terminal; and
- the communication target terminal determining one or more transmitting/ receiving assistant terminals among the responding terminals, when one or more terminals, each of which has received the transmitting/receiving assistance request signal and is in an idle communication state with respect to the base station, respond to the transmitting/receiving assistance request.

13. The method according to claim 12, wherein the transmitting/receiving assistant terminals are terminals, each of which has not acquired the LOS channel with the base station.

14. The method according to claim 12, further comprising:
- one of the transmitting/receiving assistant terminals requesting that the communication target terminal allow the transmitting/receiving assistant terminal to leave the transmitting/receiving terminal group; and
- the communication target terminal permitting the transmitting/receiving assistant terminal that requested leaving from the group to leave the corresponding group, and forming the transmitting/receiving terminal group again using remaining transmitting/receiving assistant terminals.

* * * * *

UNITED STATES PATENT AND TRADEMARK OFFICE
CERTIFICATE OF CORRECTION

PATENT NO. : 8,472,869 B2  Page 1 of 1
APPLICATION NO. : 12/682179
DATED : June 25, 2013
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this
Eighth Day of September, 2015

Michelle K. Lee
*Director of the United States Patent and Trademark Office*